United States Patent [19]
Falkenberg et al.

[11] 3,719,532
[45] March 6, 1973

[54] THERMOGENERATOR WITH THERMOELECTRIC ELEMENTS IN EXHAUST DUCTS

[75] Inventors: Dieter Falkenberg, Erlangen; Josef Winkler, Nurnberg, both of Germany

[73] Assignee: Siemens Aktiengesellschaft, Berlin and Munich, Germany

[22] Filed: June 18, 1970

[21] Appl. No.: 47,223

[30] Foreign Application Priority Data

June 25, 1969 Germany............P 19 32 087.7

[52] U.S. Cl. ............136/208, 136/227, 136/230, 310/4
[51] Int. Cl. ..............................................H01v 1/30
[58] Field of Search......136/208, 205, 211, 230, 227; 310/4

[56] References Cited

UNITED STATES PATENTS

| 3,082,275 | 3/1963 | Talaat | 136/208 |
| 3,291,189 | 12/1966 | Schade, Jr. | 136/205 X |
| 3,269,873 | 8/1966 | Dent | 136/208 |
| 3,457,121 | 7/1969 | Tomlinson | 136/208 |
| 3,329,532 | 7/1967 | Austin et al. | 310/4 |

FOREIGN PATENTS OR APPLICATIONS 232,271   10/1959   Australia..............136/208

OTHER PUBLICATIONS

"The Efficiency of Thermoelectric Generators", Telkes, Journal of Applied Physics, Vol. 18, No. 6, Dec. 1947, pages 1,116–1,127.

*Primary Examiner—*
*Attorney*—Curt M. Avery, Arthur E. Wilfond, Herbert L. Lerner and Daniel J. Tick

[57] ABSTRACT the hot heat exchangers of a plurality of p and n conductivity thermoelement legs positioned between hot and cold heat exchangers are housed in a combustion chamber and are heatable by combustion gases in the chamber. An exhaust duct for the combustion chamber is coupled thereto in a manner whereby the flow direction of the combustion gases in the combustion chamber is reversed and at least part of the combustion gases again flows over the hot heat exchangers.

1 Claim, 3 Drawing Figures

THERMOGENERATOR WITH THERMOELECTRIC ELEMENTS IN EXHAUST DUCTS

DESCRIPTION OF THE INVENTION

The invention relates to a thermogenerator. More particularly, the invention relates to a thermogenerator having p and n conductivity type thermoelement legs positioned between hot and cold heat exchangers. At least part of the hot heat exchangers are located in a combustion chamber of a gas burner and may be heated by the combustion gases. The combustion chamber has an exhaust duct.

In a thermogenerator, a plurality of thermoelements are usually adjoined in such a manner that in each case their hot or cold points are positioned on one surface, which is the hot or cold side of the thermogenerator. Each thermoelement comprises a pair of thermoelement legs, one of which is of p conductivity type thermoelectrically active material and the other of which is of n conductivity type thermoelectrically active material. The thermoelement legs are electrically connected on their hot and cold sides by contact bridges of electrically and thermally conductive material in a manner whereby all the thermoelement legs are electrically connected in series and are thermally connected in parallel.

The hot and cold sides of the thermoelements may be provided with a heat exchanger, which is separated from the contact bridges by a layer of heat conductive electrically insulating material. The contact bridges themselves may also function as heat exchangers. If the contact bridges are utilized as heat exchangers, the thermally conductive and electrically insulating layer is eliminated and the heat resistance in the path of the heat flow across the thermoelement legs is particularly low.

The efficiency of the thermogenerator depends, among other factors, on the thermoelectric effectiveness of the material of the thermoelement leg $$z = \alpha^2 \delta/K$$

wherein $\alpha$ is the thermoelectric power $\delta$ is the electrical conductivity and $K$ is the thermal conductivity of the material. The effectiveness $z$ also depends upon the temperature $T$ to which the thermoelement legs are subjected.

A temperature range exists for each thermoelectrically effective material, in which the thermoelectric effectiveness and efficiency of the thermogenerator are optimal. The hot side temperature of the thermoelement leg in a thermogenerator must be selected in a manner whereby the thermoelement legs are positioned in the optimal temperature range of the thermoelectrically effective material utilized, so that as a result, the efficiency of the thermogenerator relative to the effectiveness $z$ is at an optimum.

In flame-heated thermogenerators of the type hereinbefore described, which are commercially available, a temperature gradient developes in the combustion chamber. The temperature range between the hotest and coldest points in the combustion chamber may extend to 150°. Thermoelement legs whose hot heat exchangers are positioned in the combustion chamber are therefore subjected to various temperatures and not all the thermoelement legs are within the optimal temperature range. The efficiency of the thermogenerator is therefore adversely affected.

The principal object of the invention is to provide a new and improved thermogenerator.

An object of the invention is to provide a thermogenerator which overcomes the disadvantages of known types of thermogenerators.

An object of the invention is to provide a thermogenerator having a good efficiency.

An object of the invention is to provide a thermogenerator in which the temperature in the combustion chamber remains as uniform as possible and the efficiency of which is not adversely effected.

An object of the invention is to provide a thermogenerator which does not adversely influence the temperature distribution in the combustion chamber.

An object of the invention is to provide a thermogenerator which is efficient, effective and reliable in operation.

In accordance with the invention, the exhaust duct is positioned and designed so that the flow direction of the combustion gases is reversible and at least part of such combustion gases may be guided in the opposite direction over the hot heat exchangers of the thermoelement legs.

Contrary to known types of thermogenerators, the thermogenerator of the invention has a temperature range of only 30° in the combustion chamber. The temperature range remains substantially without influence on the adjustment of the thermoelectrically active material of the thermoelement legs and on the geometrical optimization of the thermoelement legs. This provides an increase in efficiency of a few percent over the known flame-heated thermogenerators.

An under-pressure may be provided in the exhaust duct relative to the combustion chamber. Furthermore, the exhaust duct may be provided with an opening for the supply of fresh air thereto. It is advantageous to provide a gas burner with catalytic combustion. The gas burner may be of rod-like configuration. The combustion chamber may comprise a hollow cylinder surrounding the burner, which cylinder is closed at the rod end which is positioned opposite the gas supply duct of the gas burner. At the burner end, where the gas supply duct is positioned, the exhaust duct may extend from the combustion chamber and the hot heat exchangers of the thermoelement legs may be positioned on the wall of the hollow cylinder.

In order to further increase the efficiency, the hot heat exchangers of the thermoelement legs may be positioned in the exhaust duct and the material of the thermoelement legs may show its optimum effectiveness at a lower temperature than the material of the thermoelement legs whose heat exchangers are positioned in the combustion chamber. The combustion gases flowing out of the combustion chamber have considerable thermal energy which is not utilized for the generation of current. If additional thermoelement legs are positioned in the exhaust duct and have thermoelectrically effective material which is adjusted to the lower temperatures of the combustion gases compared with the temperatures in the combustion chamber, the heat energy of the exhaust gases will also be utilized and the efficiency of the thermogenerator will be further increased. This is accomplished by utilizing various thermoelectrically effective materials for the thermoelement legs in the exhaust duct, in order to adjust to the temperature drop along the flow direction of the combustion gases.

The material of the thermoelement legs whose hot heat exchangers may be positioned in the combustion chamber may comprise a GeSi or PbTe alloy. The material of the thermoelement legs whose heat exchangers are positioned in the exhaust duct may comprise PbTe and/or a mixed crystal utilizing $Bi_2Te_3$ as a mixed crystal component. The optimum temperature range of GeSi alloys is between 700° and 900°C. The optimum temperature range of PbTe alloys is between 400° and 500°C. The optimum temperature range of mixed crystals utilizing $Bi_2Te_3$ is between 200° and 300°C. Thermoelement legs comprising a GeSi alloy in the combustion chamber may therefore be connected to the exhaust duct and followed by thermoelement legs of mixed $Bi_2Te_3$ crystals. The thermoelement legs in the exhaust duct should be positioned at points within the temperature range of optimum effectiveness.

In accordance with the invention, a thermogenerator having a plurality of p and n conductivity type thermoelement legs positioned between hot and cold heat exchangers comprises a combustion chamber housing at least part of the hot heat exchangers. The combustion chamber has a gas burner therein. The hot heat exchangers of the thermoelement legs are heatable by combustion gases in the combustion chamber. An exhaust duct for the combustion chamber is coupled to the combustion chamber in a manner whereby the flow direction of the combustion gases in the combustion chamber is reversed and at least part of the combustion gases again flows over the hot heat exchangers.

The exhaust duct has an opening formed therethrough for supplying fresh air thereto and produces an under-pressure therein with regard to the combustion chamber.

The gas burner is a catalytic combustion burner and is of rod-like configuration. The combustion chamber is a hollow cylinder surrounding the gas burner and closed at its end opposite gas supply means coupled to an end of the gas burner for supplying gas to the burner.

The exhaust duct opens out of the combustion chamber in the area of the end of the gas burner to which the gas supply means is coupled. The hot heat exchangers are positioned on the wall of the combustion chamber. A second plurality of p and n conductivity type thermoelement legs are positioned between hot and cold heat exchangers with the hot heat exchangers in the exhaust duct. The thermoelement legs of the second plurality comprises material having a maximum effectiveness at lower temperature than the material of the thermoelement legs in the combustion chamber. The thermoelement legs in the combustion chamber comprise a GeSi alloy. The thermoelement legs in the combustion chamber comprise a PbTe alloy. The thermoelement legs in the exhaust duct comprise a PbTe alloy. The thermoelement legs in the exhaust duct comprise a mixed crystal having a $Bi_2Te_3$ mixed crystal component.

In order that the invention may be readily carried into effect, it will now be described with reference to the accompanying drawings, wherein.

In the FIGS., the same components are identified by the same reference numerals.

Figure 1:
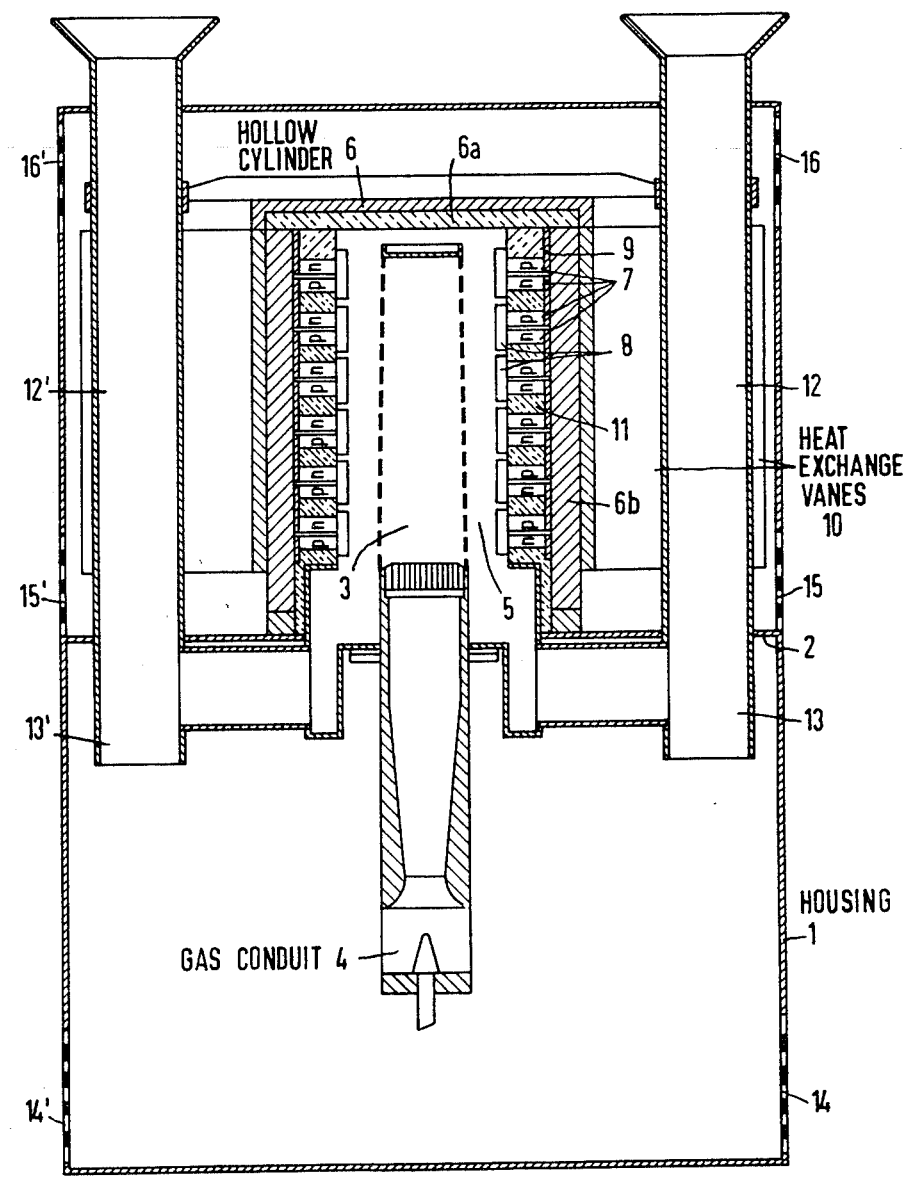
FIG. 1 is a sectional view of an embodiment of the thermogenerator of the invention.

In FIG. 1, the thermogenerator is enclosed in a housing 1. A rod-shaped burner 3 is affixed to a carrier plate 2 of the housing 1 via a gas conduit 4. The gas conduit 4 may be supplied with fluid gas, for example. The rod-shaped burner 3 is preferably a catalytic combustion burner. The burner 3 is positioned in a combustion chamber 5 of a hollow cylinder 6. The end hollow cylinder 6 is closed at the end of the burner positioned opposite the gas supply conduit 4.

A plurality of thermoelement conducting legs 7 are positioned in the wall of the hollow cylinder 6. Thermoelement legs 7 are of p and n conductivity type, as indicated. The thermoelement legs are electrically connected in series via electrically conductive contact bridges 8 and 9. The thermoelement legs 7 are positioned in parallel for the thermal heat flow. The electrically conductive contact bridges 8 project into combustion chamber 5 and are heated by the combustion gases.

The hollow cylinder 6 is a heat exchanger for the electrically conductive contact bridges 9. Heat exchange vanes 10 are mounted outside the hollow cylinder 6. A thermally conductive and electrically insulating material 6a is positioned within hollow cylinder 6 at the closed end thereof. A thermally conductive and electrically insulating material 6b is provided between the electrically conductive contact bridges 9 and the hollow cylinder 6. The thermally conductive electrically insulating material 6a and 6b may comprise, for example, aluminum oxide or beryllium oxide. Each pair of thermoelement legs 7 is covered by thermally insulating material 11 in order to avoid a thermal short-circuit of said thermoelement legs.

Exhaust ducts 12 and 12' extend from the combustion chamber 5. The openings for the exhaust ducts 12 and 12' are positioned adjacent the end of the gas burner 3 at which the gas is supplied via the conduit 4. The exhaust ducts 12 and 12' have openings 13 and 13' formed therein through which fresh air may enter into said ducts. This produces an under-pressure in the exhaust ducts 12 and 12' against the pressure in the combustion chamber 5.

The flow direction of the combustion gases is determined in the combustion chamber 5 by the position and design of the exhaust ducts 12 and 12'. Due to the gas flowing into the combustion chamber 5, the combustion gas is urged against the thermally insulating material 6a at the end of the hollow cylinder 6 and is diverted at said end. Since there is an under-pressure in the exhaust ducts 12 and 12', the diverted combustion gas flows to the outlets of the exhaust ducts 12 and 12' via the contact bridge 8 of the thermoelement legs 7.

Since the combustion gas flows over the contact bridges 8 of the thermoelement legs 7, after being diverted at the end of the hollow cylinder 6, said combustion gas flows in reverse over said contact bridges. As a result, a mixed uniform temperature distribution is provided in the combustion chamber 5. Temperatures in the combustion chamber have a maximum range of 30°C. At such uniform temperatures in the combustion chamber 5, it is possible to utilize the thermogenerators at an optimum and to attain an increase in efficiency of a few percent relative to known types of flame-heated thermogenerators.

A plurality of openings 14, 15, 16, 14', 15' and 16' are formed through the walls of the housing 1. Fresh air for the exhaust ducts 12 and 12' is supplied via the openings 14 and 14', respectively. Cooling air for the heat exchange vanes 10 of the thermogenerators is supplied to the housing via the openings 15 and 15' and is derived from the housing via the openings 16 and 16'.

Figure 2:
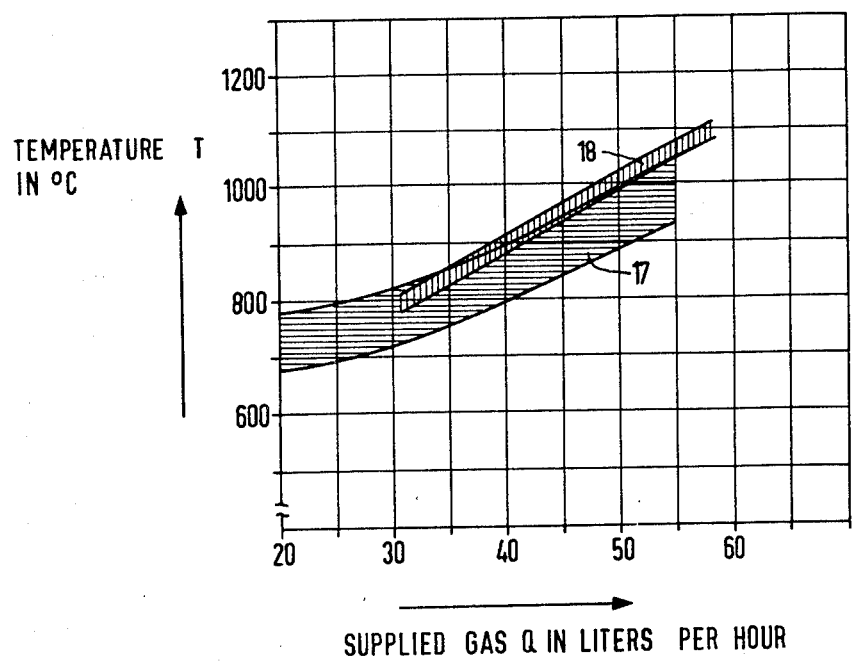
FIG. 2 is a graphical presentation of the supplied gas versus the temperature in the combustion chamber.

FIG. 2 illustrates the dependence of the temperature T in the combustion temperature 5 upon the quantity q of gas supplied to the gas burner 3. In FIG. 2, the abscissa represents the supplied gas $q$ in liters per hour and the ordinate represents the combustion chamber temperature T°C. The cross-hatched area 17 illustrates the maximum temperature range in the combustion chamber of a known flame-heated thermogenerator. The cross-hatched area 18 illustrates the maximum temperature range in the combustion chamber of the thermogenerator of the invention.

FIG. 2 illustrates that in the thermogenerator of the invention, the temperature in the combustion chamber is higher at a uniformly supplied quantity of gas q and that the temperature range, relative to known thermogenerators, is reduced by 70 to 80 percent. The increase in efficiency of the thermogenerator of the invention is accomplished by the decrease of the maximum temperature range in the combustion chamber 5, and by the increase of the temperature in said combustion chamber.

Figure 3:
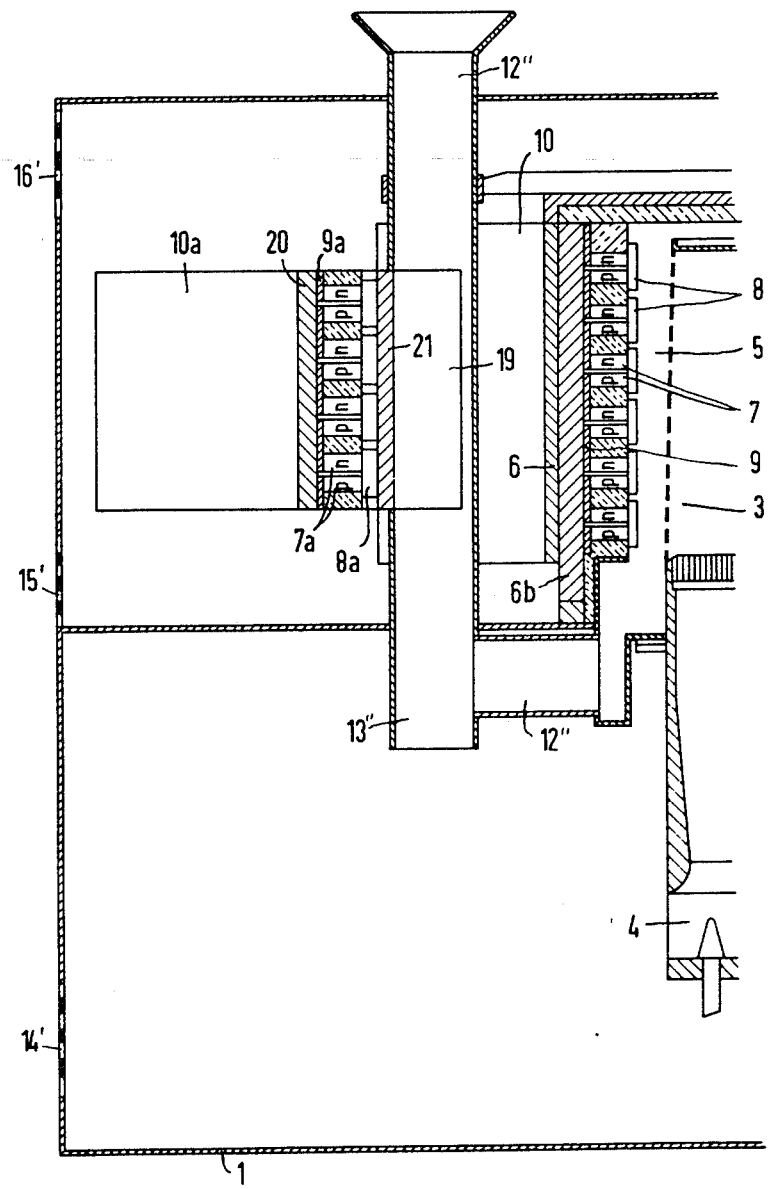
FIG. 3 is a sectional view of another embodiment of the thermogenerator of the invention, which embodiment includes thermoelement legs in the wall of the exhaust duct.

In the embodiment of FIG. 3, a plurality of additional thermoelement legs 7a are provided. The additional thermoelement legs 7a have heat exchange vanes 19 which extend into the exhaust duct 12''. The additional thermoelement legs 7a in the walls of the exhaust duct 12'' are of the same structure as the thermoelement legs 7 positioned in the combustion chamber 5.

A heat exchanger 20, having heat exchange vanes 10a, is mounted on the electrically conductive contact bridges 9a between the thermoelement legs 7a. An additional heat exchanger 21 is mounted on the electrically conductive contact bridges 8a of the thermoelement legs 7a. The heat exchange vanes 19 of the heat exchanger 21 are positioned inside the exhaust duct 12''.

The material of the thermoelement legs 7a has an optimum thermoelectric effectiveness at a lower temperature than the material of the thermoelement legs 7. The thermal energy of the combustion gases is utilized, via the additional thermoelement legs 7a, to generate a current, the thermal energy of which escapes unutilized in known types of thermogenerator.

The thermoelement legs 7 in the combustion chamber 5 may comprise a GeSi or PbTe alloy. The thermoelement legs 7 may be followed, in the exhaust duct 12'', by the additional thermoelement legs 7a which may comprise PbTe and/or $Bi_2Te_3$ and $Sb_2Te_3$ or $Bi_2Te_3$ and $Bi_2Se_3$. If the thermoelement legs 7 comprise PbTe, the additional thermoelement legs 7a may comprise $Bi_2Te_3$ and $Sb_2Te_3$ or $Bi_2Te_3$ and $Bi_2Se_3$.

While the invention has been described by means of specific examples and in specific embodiments, we do not wish to be limited thereto, for obvious modifications will occur to those skilled in the art without departing from the spirit and scope of the invention.

We claim:

1. A thermogenerator having a plurality of p and n conductivity type thermoelement legs positioned between hot and cold heat exchangers, said thermogenerator comprising a combustion chamber housing at least part of the hot heat exchangers, said combustion chamber having a gas burner therein, the hot heat exchangers of said thermoelement legs being heatable by combustion gases in said combustion chamber;

an exhaust duct for said combustion chamber coupled to said combustion chamber in a manner whereby the flow direction of the combustion gases in said combustion chamber is reversed and at least part of the combustion gases again flows over the hot heat exchangers; and a second plurality of p and n conductivity type thermoelement legs positioned between hot and cold heat exchangers with said hot heat exchangers in said exhaust duct, the thermoelement legs of said second plurality comprising material having a maximum effectiveness at lower temperature than the material of the thermoelement legs in said combustion chamber.

2. A thermogenerator as claimed in claim 1, wherein the thermoelement legs in said combustion chamber comprise a GeSi alloy.

3. A thermogenerator as claimed in claim 1, wherein the thermoelement legs in said combustion chamber comprise a PbTe alloy.

4. A thermogenerator as claimed in claim 1, wherein the thermoelement legs in said exhaust duct comprise a PbTe alloy.

5. A thermogenerator as claimed in claim 1, wherein the thermoelement legs in said exhaust duct comprise a mixed crystal having a $Bi_2Te_3$ mixed crystal component.

* * * * *